June 7, 1932. G. GORTON 1,862,052
ROUTING, MILLING, AND OTHER MACHINE TOOL
Filed May 15, 1929 4 Sheets-Sheet 1

June 7, 1932.  G. GORTON  1,862,052
ROUTING, MILLING, AND OTHER MACHINE TOOL
Filed May 15, 1929  4 Sheets-Sheet 2

Inventor
George Gorton
By
Herbert E. Peck  Attorney

June 7, 1932.   G. GORTON   1,862,052

ROUTING, MILLING, AND OTHER MACHINE TOOL

Filed May 15, 1929   4 Sheets-Sheet 4

Inventor
George Gorton
By
Hubert E. Peck Attorney

Patented June 7, 1932

1,862,052

UNITED STATES PATENT OFFICE

GEORGE GORTON, OF RACINE, WISCONSIN

ROUTING, MILLING, AND OTHER MACHINE TOOL

Application filed May 15, 1929. Serial No. 363,152.

This invention relates to machine tools and particularly machines, having a vertical rotary working spindle, such as routing and/or milling machines and the like; and the objects and nature of the invention will be understood by those skilled in the art in the light of the following explanations of the accompanying drawings showing what I now believe to be the preferred mechanical expression or embodiment of the invention from among other forms, constructions and arrangements within the spirit and scope of my invention.

An object of the invention is to provide an improved machine tool embodying a standard or any suitable adjustable knee and adjustable work table carried thereby combined with a horizontally adjustable head carrying the cutter head overhanging the knee and work table with improved arrangements rendering the machine exceedingly compact and convenient for operation and adjustment, providing a comparatively wide range of adjustments without the necessity of resetting the work on its table.

With the foregoing and other objects in view my invention consists in certain novel features of combination, arrangements, and construction as more fully and particularly explained and specified hereinafter.

Referring to the accompanying drawings, forming a part hereof:

Figure 1:
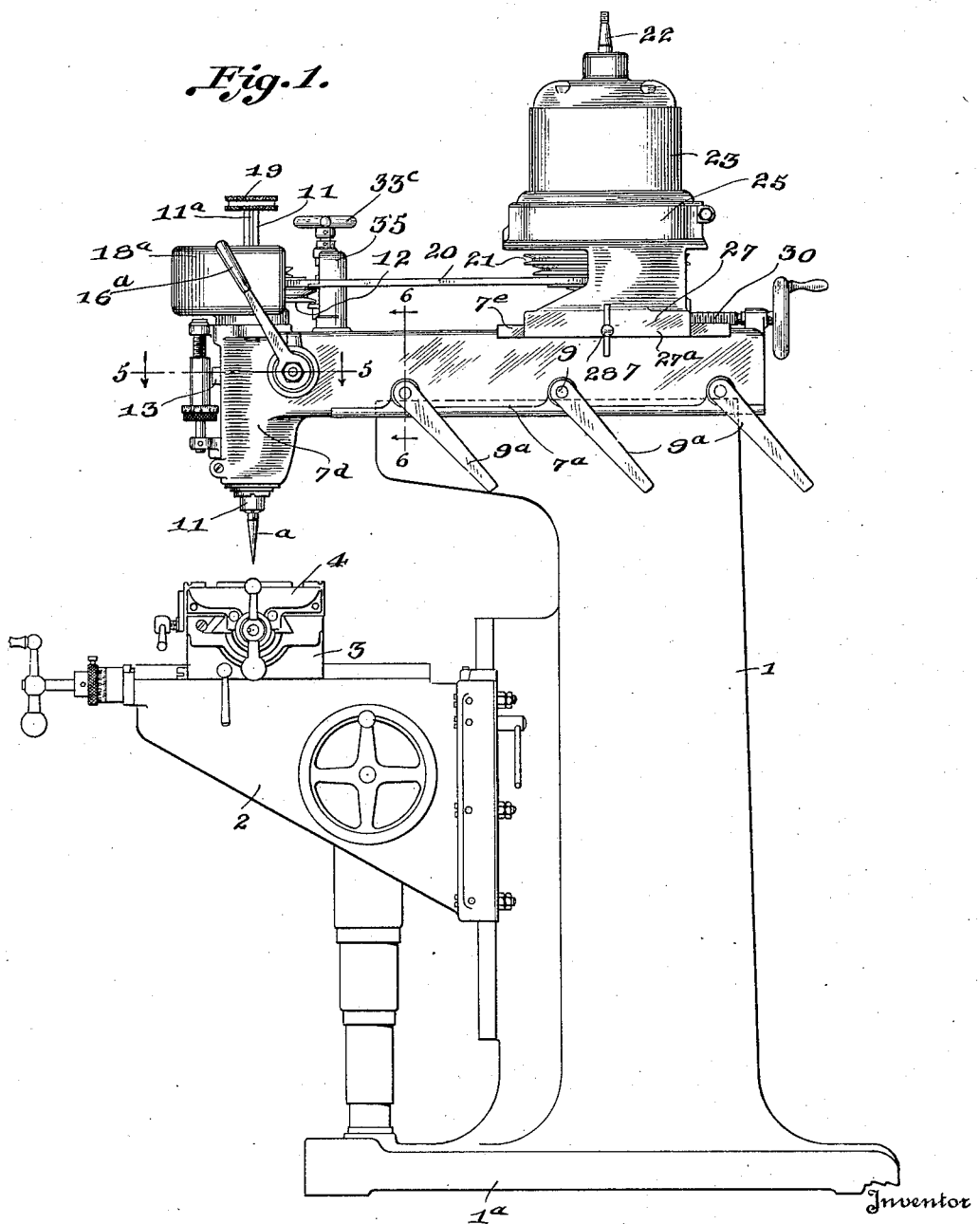
Fig. 1 is a side elevation of a machine tool embodying my invention.
Figure 2:
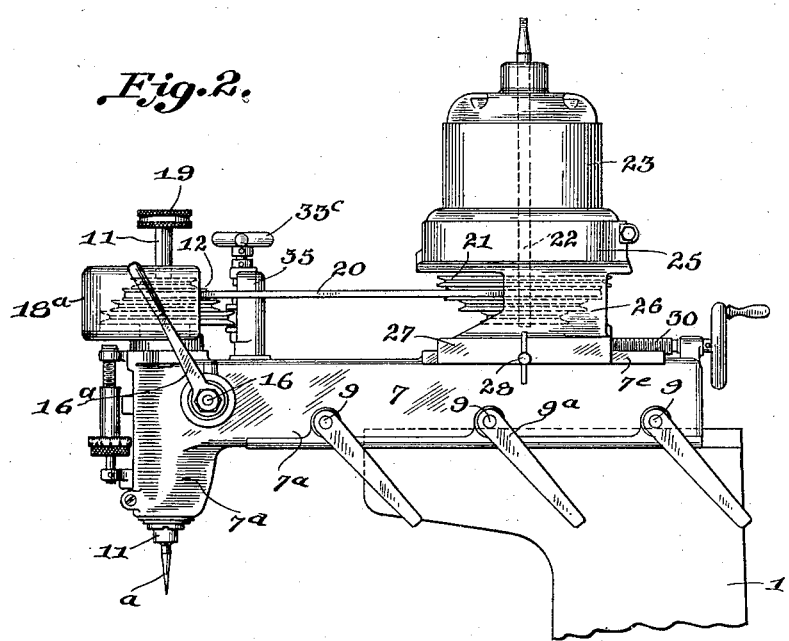
Fig. 2 is a side elevation of the tool of Fig. 1, parts being broken away and the sliding head being shown adjusted forwardly of the position shown by Fig. 1.
Figure 3:
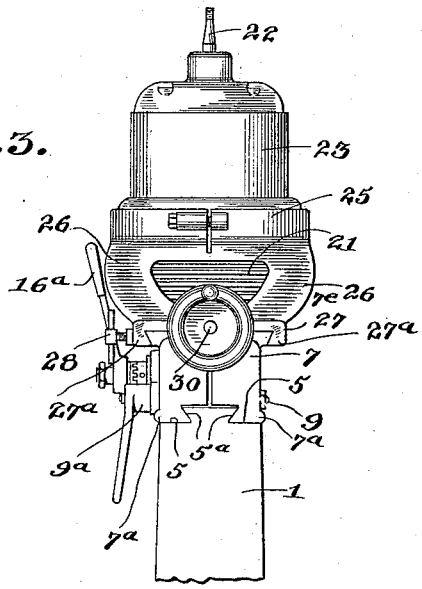
Fig. 3 is a rear elevation of the structure shown by Fig. 2.
Figure 4:
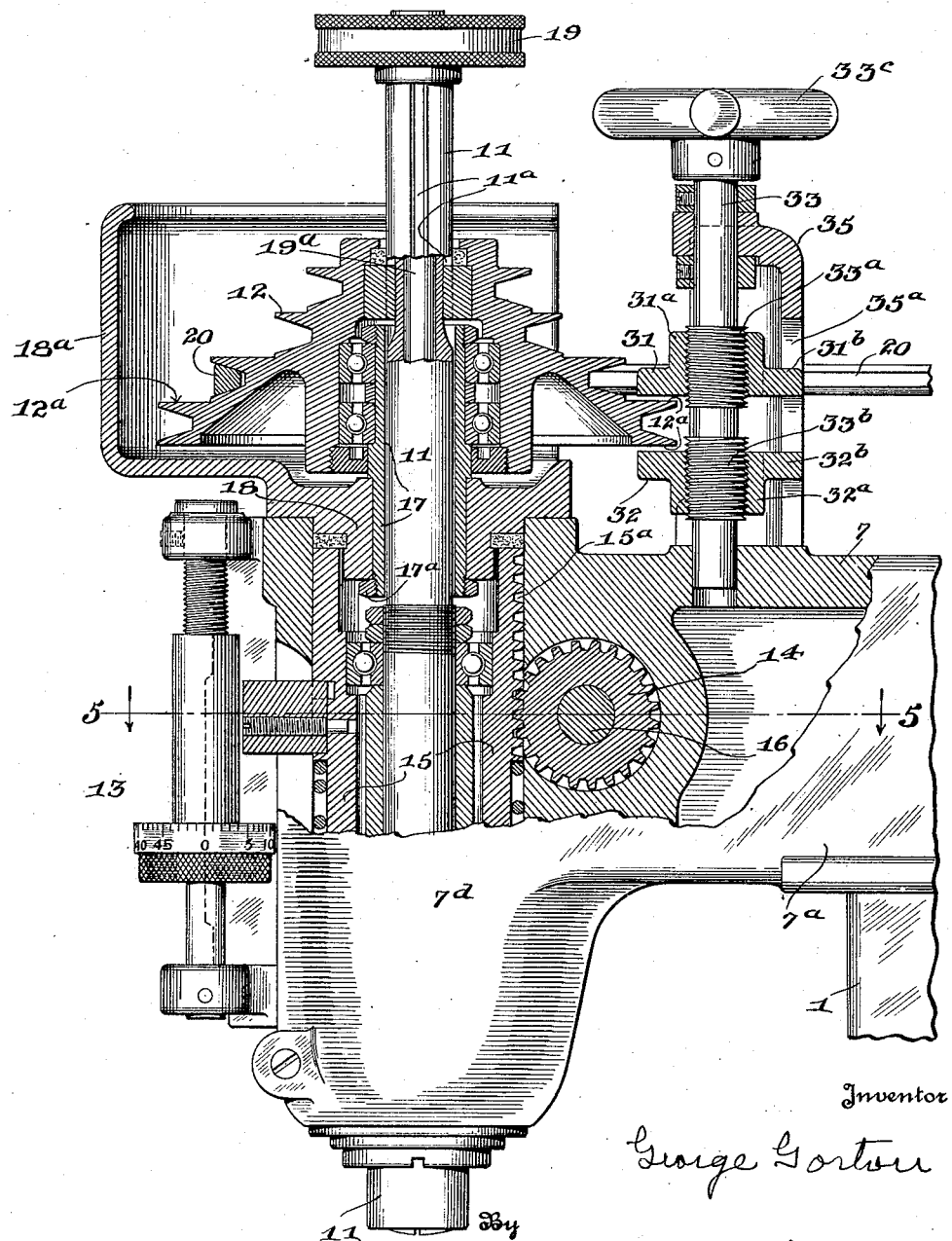
Fig. 4 is an enlarged detail sectional elevation of the front end portion of the sliding head and the cutter spindle assembly carried thereby.
Figure 5:
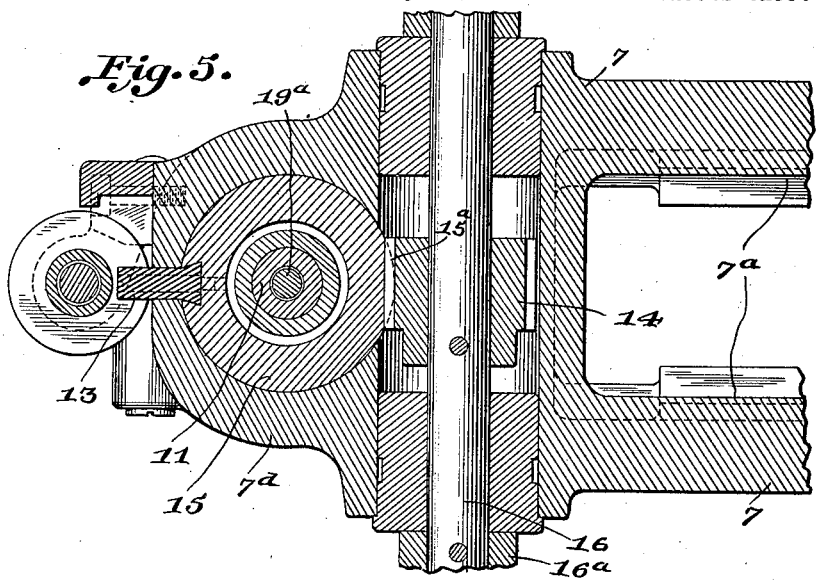
Fig. 5 is a detail horizontal section on the lines 5—5, Figs. 1 and 4.
Figure 6:
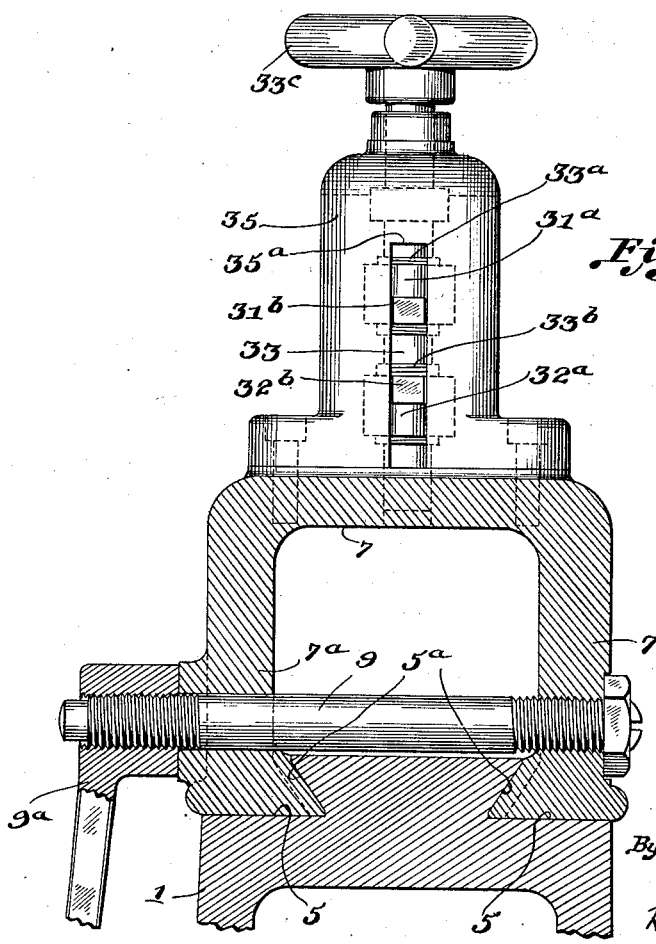
Fig. 6 is a detail cross section on the line 6—6, Fig. 1.

In the particular embodiment shown by the drawings, I provide a strong rigid upright pedestal, column or standard 1, carried by a suitable base 1a, and provided with a vertically adjustable knee 2, projecting forwardly from the pedestal, and equipped with any suitable means for adjusting the same vertically and locking the same in the position to which adjusted. On this knee is mounted and adjustable a suitable slide or carrier 3, for the horizontal work table 4, which, in this example, is adjustable with respect to its carrier 3. For instance, the slide or carrier 3, is horizontally adjustable on the knee forwardly and rearwardly i. e., toward and from the pedestal 1, and the work table 4, is horizontally adjustable on its carrier transversely thereof, i. e., at right angles to the direction in which the carrier 3, is adjustable.

The pedestal extends upwardly to a horizontal plane a substantial distance above the horizontal plane of the work table, and the upper end of the pedestal is horizontally elongated forwardly to preferably overhang the rear portion of the knee, and to provide a horizontal straight forwardly-elongated slideway located in a vertical plane that centrally intersects the knee, and also the work table when the table is in its central position. This slideway is preferably of the dovetailed type, providing the two opposite edge depressed parallel spaced longitudinal flat tracks or slide surfaces 5, and the intermediate longitudinal elevated guiding portion having its opposite vertical edges undercut to form V's 5a.

A longitudinally elongated horizontal head 7, is, preferably, gibbed to and fitted on said slideway of the pedestal and is slidable longitudinally thereof, i. e. forwardly and rearwardly. This elongated head 7, is of strong metal construction, preferably a hollow casting, or of so-called box construction, longitudinally open at the bottom throughout the length of its portion adapted to the slideway, providing the depending vertical longitudinal side walls 7a, the bottom longitudinal edges of which are flat to rest and slide on the slideway surfaces 5, and at their inner longitudinal edges formed to fit under the under cut walls or V's 5a, whereby the head is held down to the slideway.

The depending side walls 7a, of the slidable head are more or less flexible or resilient transversely, and this quality is taken advantage of for locking the head to and releasing the same from the pedestal for adjustment, through the medium of means to draw said walls toward each other to clamp the same in the V's 5a, and lock the head, and to release said walls to spring outwardly from the V's so that the head can easily slide forwardly and rearwardly on the pedestal, under pushing force applied by the hands.

In the example shown, I provide several clamping bolts 9, employed for locking and releasing the head. These bolts are spaced apart longitudinally of the head and extend transversely through the head and above the top of the pedestal, and traverse the lower portions of the resilient depending side walls and are coupled thereto. These bolts 9, are provided with exterior accessible nuts 9a, capable of being rotated to quickly release and clamp the head.

The length of this approximately one-piece strong sliding head preferably exceeds the length of the elongated pedestal top on which the head is mounted, and the front end thereof which centrally overhangs the knee forms and constitutes the supporting housing of the machine cutter head, in that it carries and supports the rotary cutter assembly. To this end, the casting or metal box forming the head 7, is at its front end elongated vertically, and formed with a central vertical bore extending completely therethrough, to constitute the cutter head supporting housing 7d.

The cutter assembly is supported by the said housing which is integral with head 7, and said assembly extends through said vertical housing bore and embodies a vertical rotary cutter spindle 11, depending from the housing and at its lower end formed to centrally receive the vertical depending rotary cutter a, and is provided with suitable means whereby cutters can be removed and replaced and locked to the spindle for operation. The cutter spindle 11, extends upwardly to a point above the horizontal plane of the sliding head 7, and is there provided with a driving pulley 12, preferably a pulley of several steps. In the example shown, the cutter spindle is longitudinally movable through the pulley, for feeding the cutter to and from the work, although in constant rotary driven relation to the pulley, as by one or more longitudinal keyways 11a, in the spindle receiving one or more keys fixed to the pulley and projecting into the pulley bore that receives the spindle.

In this example, the cutter spindle is mounted in, carried by and extends through a non-rotary longitudinally slidable vertical sleeve 15, confined in the bore of the cutter head housing. This sleeve is raised and lowered to lift the rotary cutter from and to feed the same to the work, by any suitable means, and its movement toward the work to control the working depth of the cutter is controlled by any suitable cutter depth stop. An example of such a stop is generally shown at 13, at the front of said housing.

The means shown in this example for raising and lowering the sleeve 15, and consequently the cutter, includes a gear 14, meshing with a rack 15a, arranged longitudinally of and preferably exteriorly cut in the sleeve. The gear 14 is fixed to a cross shaft 16, extending through the housing to the rear of the housing bore and provided with an exterior handle 16a, accessible at the side of the sliding head.

The cutter spindle driving pulley 12, is, in this instance, supported and mounted through the medium of suitable ball bearings, on a fixed vertical sleeve 17, fitting and clamped in the bore of the depending hub 18, of an upstanding cup-like guard 18a for and approximately surrounding the spindle drive pulley 12. The guard and its hub 18, are formed, in this example, by a single strong casting. The hub 18, depends from the floor of the guard and the longitudinal bore of the hub opens upwardly through said floor. The fixed sleeve upstands in the guard and depends through the hub and is normally fixed therein as by nut 17a, on the threaded lower end of the sleeve and tightened against the bottom edge of the hub to draw an exterior shoulder of the sleeve against the floor of the guard. The guard thus carries the pulley 12, and its mounting and the hub 18, is stationarily fitted tightly down in the upper end of the bore of the cutter head housing of sliding head 7, with the guard above said housing and sliding head, and with the cutter spindle 11, rotatably fitting in and extending through said sleeve 17, and upwardly through the hub of pulley 12, to a point above the pulley and its guard 18a.

In the drawings, a hand wheel 19, appears above the upwardly extended upper end of the rotary cutter tubular spindle. This handle is fixed to the upper end of a screw threaded shaft or rod 19a, extending longitudinally through said spindle to open and close the cutter clamping collet or other chuck in the lower end of the spindle, to lock and release the cutter a, in the lower end of the spindle. The rod normally rotates with the spindle, but can be rotated within the spindle, by means of said handle 19, exposed and accessible above the sliding head and pulley guard, to operate the cutter clamp or chuck to release the rotary cutting tool for removal and replacement and to lock the same in operative position in and to the spindle.

The cutter spindle 11, is driven by endless driving belt 20, applied to one of the steps of spindle driving pulley 12, and extending horizontally and rearwardly therefrom longitudinally of and above the slidable head, to and driven by the horizontal pulley 21, on the lower end of the vertical rotary shaft 22, of vertically arranged electric motor 23. The motor driven pulley 21, is multi-stepped to correspond to the multi-stepped spindle pulley 12, and the driving belt 20, can be shifted from step to step of these pulleys to vary the spindle speed, although I do not wish to limit all features of my invention to a belt drive, nor to the particular pulley arrangement, nor to the particular pulleys shown in the example illustrated.

The pulley guard 18a, is cut away or open at its rear side for the free passage of the driving belt to the spindle driving pulley 12.

The motor 23, is carried by the slidable head and is adjustable longitudinally thereof for maintaining the driving belt under the desired tension.

In the example illustrated, the motor 23, is suitably housed and is arranged vertically above the rear portion of the slidable head, and is carried by an annular strong metal holder 25, surrounding the lower end of the motor housing and clamped or otherwise secured thereto to rigidly support and uphold the motor. This holder embodies or is formed with spaced opposite side depending strong metal webs or uprights 26, fixedly supporting and upholding the holder and the motor in an elevated position. These upstanding supporting webs 26, are preferably integral with and rise from the opposite side edge portions of a strong base 27, resting on the top and slidable longitudinally of the slidable head 7. The top of the rear portion of the head 7, forms a longitudinal slideway preferably having undercut or V laterally projecting side flanges 7e, receiving depending side flanges 27a, of the base grooved at their inner sides to slidably receive flanges 7e, while holding the base and its load down to the slideway.

A clamping screw 28, is preferably provided to clamp the base 27, in adjusted position on the slidable head. If so desired, a feed screw 30, having a suitable handle at its rear end for rotating the screw, can be rotatably mounted at its rear portion to the rear of the slidable head 7, and extend forwardly over the head and longitudinally enter and mesh with a nut carried by or formed in the base 27, to adjust the base and its load longitudinally of the slidable head, when clamping screw 28, has been loosened.

The base 27, upstanding webs 26, and holder 25, constitute, what is preferably, a unitary structure, forming a supporting slide for the motor and whereby the motor is mounted on top of and arranged above the slidable head 7, and adjustable longitudinally thereof.

The considerable weight of the motor and its supporting slide on the rear portion of the slidable head 7, overbalances the front end of head 7, loaded as it is by the cutter head assembly and parts, and tends to steady and hold the head 7, down to the pedestal top.

The motor supporting slide provides ample space vertically between its base 27, and holder 25, for the free operation of the motor pulley located on the depending end of the rotary shaft of the motor, and the supporting webs between base 27 and holder 25, are formed to clear the motor shaft pulley and the driving belt leading horizontally therefrom to the cutter spindle pulley.

It is desirable to provide a cutter spindle brake for high speed cutter spindles, to enable the operator to quickly stop the cutter spindle rotation, for changing cutters or for other reasons, usually after the motor power current has been cut off. I show an easily accessible and operated brake for this purpose that cooperates with the rim portion of the cutter spindle pulley. For instance, I show the rim portion of the pulley 12, formed with horizontal flat parallel top and bottom annular braking faces or surfaces 12a, and at the rear of said pulley, I arrange a pair of cooperating brake shoes or jaws 31, 32, arranged radially of the pulley and projecting rearwardly above and below said side faces 12a, respectively, and movable toward and from each other to grip and clear said faces to apply pulley stopping or braking pressure and friction, or to release the pulley for free rotation. The jaw 31, forms a forward rigid projection of a vertically movable nut 31a, having a right screw thread, and the jaw 32, a corresponding projection rigid with a nut 32a, having a left hand screw thread, and these two nuts are threaded on a vertical rotary screw shaft 33, having a right hand screw thread 33a, for raising and lowering nut 31a, and a left hand screw thread 33b, for simultaneously forcing nut 32a, down or up in the opposite direction to the movement of nut 31a. The shaft 33, rises from the sliding head 7, and at its lower end is mounted in a bearing hole in the top wall of the head, and at its upper end is mounted to revolve in and is held against substantial axial movement by, the upper end of a bracket 35, fixed to and rising from the top wall of head 7. The upper end of rotary screw shaft 33, is equipped with an accessible handle 33c, by which the shaft can be rotated to operate the jaws or brakes 31, 32, to quickly brake and stop the pulley and consequently the cutter spindle, or to quickly release said pulley.

The upstanding bracket 35, is vertically slotted at 35a, to slidably received rearwardly projecting lugs 31b, 32b, rigid with the nuts 31a, 32a, respectively, to hold said nuts against rotation, while permitting free vertical movement of the nuts under the forcing power of the screw threaded portions of shaft 33.

It will be noted that the sliding head 7, carries the entire cutter head assembly as well as the motor and drive for said assembly, and that the cutter head assembly is arranged centrally of the longitudinal axis of the sliding head and centrally over the knee and the work table when that table is in its central position. The sliding head can be quickly released for longitudinal sliding adjustment and can be as quickly clamped in rigid operative position, and that a wide operative range of adjustment is provided to enable the rotary cutter to reach various portions of the work without requiring resetting of the work on the work table, and the machine, as an entirety is of maximum range and capacity.

The sliding head constitutes a compact self contained unit carrying the cutter spindle and complete drive, independent of the balance of the machine, and when clamped in operative position, the pedestal and said head become in effect, one solid rigid structure, whereby accuracy in cutting operations is rendered possible because the cutter head supporting housing is a rigid, preferably integral part of the sliding head centrally arranged at the front end thereof.

I do not in this case make claim to the cutter depth assembly, as I make claim to such assembly in my application filed August 21, 1929, Ser. No. 387,330; and I do not herein make claim to the cutter spindle brake as such brake is claimed in my divisional application filed March 19, 1931, Ser. No. 523,873.

It is evident that various changes, modifications, and departures might be resorted to without departing from the spirit and scope of my invention, and hence I do not wish to limit myself to the disclosure except where required by the claims construed in the light of the prior art.

What I claim is:

1. In a machine tool, in combination; a pedestal having a horizontally disposed guideway; a forwardly-extending slide adjustable longitudinally of said guideway; means whereby said slide is normally operatively fixed with respect to said pedestal; the front end of said slide forming a cutter head housing with a bore extending vertically therethrough; a hub in the upper end of said bore and normally fixed with respect to said housing and provided with an upstanding rigid guard above said housing and open at the top and rear; a vertical rotary cutter spindle extending upwardly through said hub and mounted in and extending above and below said bore of the housing; a concentric drive pulley for said spindle, said pulley arranged within said guard and above said housing; and a rotary motor for driving said pulley by a belt drive extending through the open rear of said guard, said motor being carried by said slide.

2. In a machine tool, in combination; a supporting frame having a horizontally disposed guideway; a forwardly projecting slide confined to said guideway, and at its front end having a bore extending vertically therethrough; a hub normally fixed to said front end in the upper end of said bore; a sleeve concentric with said bore and fixed in and rising from said hub; a pulley for driving the rotary cutter spindle, said pulley being arranged above said end and hub concentric with and rotatively supported by said sleeve; a rotary cutter spindle extending longitudinally through and depending from said bore and mounted therein, said spindle extending upwardly through said hub, sleeve and pulley and splined to and driven by said pulley; and means carried by said slide for driving said pulley.

3. In a machine tool, in combination; a supporting frame having a forwardly extending guideway; a forwardly projecting longitudinally elongated slide in said guideway; means for normally securing said slide rigid with said frame; the front end of said slide having a bore extending vertically therethrough and approximately intersecting the center longitudinal axis of said slide; a rotary cutter spindle extending through said bore and extending above and below the same; a concentric pulley for driving said spindle, said pulley being supported by and arranged above said end; a motor, said motor having a vertical motor shaft the longitudinal axis of which approximately intersects said longitudinal axis of said slide; a holder carrying said motor and provided with a base on and adjustable longitudinally of said slide, said base having a fixed upstanding support to said holder to maintain the motor in an elevated position, said motor shaft depending and having a pulley below the motor and above the base, said support being open for the passage of a belt drive from the motor pulley to the spindle pulley for driving the same.

4. In a machine tool, in combination; a pedestal having a forwardly extending rigid slideway with an elevated central longitudinal floor and opposite edge depressed slide floors with their inner longitudinal walls undercut; a forwardly projecting longitudinally-elongated slide throughout the major portion of its length of open-bottom box formation having laterally resilient depending longitudinal side walls at their lower portions formed to slidably fit said depressed floors and undercut walls, respectively; cross means above said slideway and connecting said resilient depending walls, whereby the lower portions of said walls can be sprung toward each other to rigidly lock the slide to the pedestal and whereby said walls can be allowed to spring in the opposite direction to release the slide for longitudinal adjustment on the pedestal; a vertical rotary cutter spindle carried by the front end of said side; and a motor mounted on the slide for driving said spindle.

5. In a machine tool, in combination; a pedestal having a rigid forwardly extending slideway having opposite longitudinal edge depressed slide floors; a forwardly-projecting longitudinal slide supported by said slideway, the portion of said slide that fits said slideway being of open-bottom box form with laterally resilient depending longitudinal side walls fitting said slide floors and the inner edge longitudinal walls thereof, respectively, and provided with manually actuated means whereby said walls can be sprung and thus held to lock the slide rigidly to the pedestal, and whereby said walls can be released to spring to position releasing the slide for longitudinal adjustment; the front end of said slide being of other than box construction and forming as an integral part of said slide, a cutter head housing having a vertical bore; a rotary cutter spindle mounted and extending through said bore and extending above and below the same and provided with spindle driving means.

6. In a machine tool, in combination; a pedestal having a rigid floor forwardly extending slideway having longitudinal slide tracks with undercut longitudinal inner edge walls; a forwardly projecting longitudinally elongated slide fitted and adjustable longitudinally of said slideway and at its front end providing a cutter head housing; a vertical rotary cutter spindle extending through and above and below said housing and provided with a concentric driving pulley above said slide; a vertical shaft motor mounted on and adjustable longitudinally of the rear top portion of said slide; means to drive said pulley from said motor shaft; at least the portion of said slide on said slideway being of open bottom box formation with longitudinal depending laterally-resilient side walls slidably fitting said tracks and their walls; and means whereby said slide side walls can be sprung toward each other to rigidly lock the slide and pedestal together and thus hold the same, and whereby said walls can be released to spring from locking positions to release the slide for adjustment.

7. In a machine tool, in combination; a pedestal having a forwardly extending slideway; a forwardly projecting slide adjustable longitudinally of said slideway; means for normally securing said slide rigidly to said pedestal; the front end of said slide having a vertical bore extending therethrough; a vertical rotary cutter spindle mounted in said bore and extending above and below said slide end and above said end provided with a concentric driving pulley; a motor having a vertical motor shaft depending therefrom and at its lower portion having a pulley; and a holder rigidly carrying said motor and provided with a depressed base on the upper rear portion of said slide and adjustable longitudinally thereof, said base having a rigid upstanding support for and rigid with said holder to maintain the motor in an elevated position with said motor pulley above the base and below the motor, said support being open for the passage of a belt drive above the slide from the motor pulley to the spindle pulley.

8. In a machine tool, in combination; a support having a forwardly extending slideway; a forwardlly projecting slide confined to and adjustable longitudinally of said slideway; the portion of the slide on said slideway being of open box formation; relatively movable slide locking and releasing means normally holding the side walls of said open box formation sprung throughout their lengths in rigid clamping relation to said support; the front end of said slide being of other than box construction and forming, as an integral part of said slide a cutter head housing with a vertical bore the longitudinal axis of which intersects the center longitudinal axis of said slide; and a rotary cutter spindle carried by said housing and extending through and above and below said bore and provided with driving means including a motor mounted on said slide.

9. In a machine tool, in combination; a support having a forwardly extending slideway; a forwardly-projecting longitudinally elongated slide centrally arranged longitudinally on said slide; means for normally holding said slide rigid with said support; the front end of said slide forming a cutter head housing as a rigid permanent part of the slide, said housing having a vertical bore; a rotary cutter spindle mounted in said bore and extending above and below said housing, the longitudinal axis of said spindlle approximately intersecting the central longitudinal axial line of said slide; a motor above the rear portion of said slide having a vertical rotary motor shaft, the longitudinal axis of which approximately intersects said central longitudinal axial line of the slide, said motor shaft and said spindle, respectively, having concentric pulleys located above said slide; and a belt drive above said slide whereby said spindle pulley is driven from said motor shaft pulley.

10. In a machine tool, in combination; a supporting structure; a vertically movable vertical rotary cutter spindle and its carrier;

guiding means for said carrier; means for moving the carrier vertically to feed the spindle toward and to retract the same from the work; an elevated spindle driving pulley supported independently of said carrier against vertical movement therewith, said spindle extending upwardly into said pulley and driven thereby and vertically movable therein; a slide rearwardly remote from and adjustable toward and from said belt pulley; and a rotary motor fixedly carried in an elevated position by said slide and provided with and driving a belt pulley located below said motor and free at its under side and accessible for shifting, application and removal of a belt extending therefrom to said spindle driving pulley for driving the same, said spindle driving pulley being free and accessible from above for shifting, application and removal of said belt.

11. In a machine tool, in combination; a supporting structure; a vertically movable vertical rotary cutter spindle and its carrier; guiding means for said carrier; means for moving the carrier vertically to feed the spindle toward and to retract the same from the work; an elevated spindle driving stepped pulley supported independently of said carrier, against vertical movement therewith, said spindle extending upwardly into said pulley and driven thereby and vertically movable therein; a slide rearwardly remote from and adjustable toward and from said belt pulley; a rotary motor fixedly carried in an elevated position by said slide and provided with and driving a stepped belt pulley located below said motor and free at its under side and accessible for shifting, application and removal of a belt extending therefrom to said spindle driving pulley for driving the same, said spindle driving pulley being free and accessible from above for shifting, application and removal of said belt; and a relatively fixed upstanding guard for said spindle pulley, said guard being open at the top and rear for passage of the belt to said spindle pulley and to render said pulley accessible for belt manipulation.

Signed at Racine, county of Racine, Wisconsin, this 17th day of May, 1929.

GEORGE GORTON.